United States Patent [19]

Toyama et al.

[11] Patent Number: 5,513,675
[45] Date of Patent: May 7, 1996

[54] PRESSURIZED FLUID HOSE

[75] Inventors: Yoshiyuki Toyama, Anjo; Yoshiyuki Takeuchi, Gamagori; Syuzi Takagi, Okazaki; Hirotune Suzuki, Toyokawa; Mikio Nakajima, Nagoya, all of Japan

[73] Assignees: Toyoda Koki Kabushiki Kaisha, Kariya; Yamasei Kogyo Co., Ltd., Nagoya, both of Japan

[21] Appl. No.: 199,935

[22] Filed: Feb. 22, 1994

[30] Foreign Application Priority Data

Feb. 23, 1993 [JP] Japan .................................. 5-033573

[51] Int. Cl.⁶ .................................................. F16L 55/10
[52] U.S. Cl. ............................ 138/109; 138/26; 285/149
[58] Field of Search ........................ 138/26, 30, 109; 285/149, 174, 256, 239, 382, 382.1, 382.2

[56] References Cited

U.S. PATENT DOCUMENTS

| 2,002,839 | 5/1935 | Stecher | 285/256 |
| 3,895,177 | 7/1975 | Muslin | 138/109 |
| 4,334,121 | 6/1982 | Kutnyak | 138/109 |
| 4,759,387 | 7/1988 | Arendt | 138/30 |

FOREIGN PATENT DOCUMENTS 421712  5/1948  Italy ........................................ 285/256

Primary Examiner—James E. Bryant, III
Attorney, Agent, or Firm—Oblon, Spivak, McClelland, Maier & Neustadt

[57] ABSTRACT

A pressurized fluid supply hose which conducts pressurized fluid discharged from a pump to a fluidically operated device is disclosed. A spiral tube formed by two spirally wound band members is fixed by caulking in one end of a steel pipe. The outer shape of the one end of the steel pipe includes a taper portion formed to slope gradually between a thin portion and an outer diameter portion. By effecting a caulking process with a caulking tool having a pressing portion extending in parallel to an outer surface of the steel pipe, the outer taper portion of the steel pipe is contracted to formed an inner taper portion at an internal surface thereof, and one end of the spiral tube is fixed to the inner taper portion. Because the spiral tube is gradually deformed along the inner taper portion of the steel pipe, it can avoided that a large clearance is formed between the two band members of the spiral tube.

2 Claims, 4 Drawing Sheets

1
PRESSURIZED FLUID HOSE

BACKGROUND OF THE INVENTION

1. Field of the Invention

The present invention relates to a pressurized fluid hose for conducting pressurized fluid discharged from a pump to a fluid operating device as a power steering apparatus and the like.

2. Discussion of the Prior Art

In power steering apparatus for use in automobiles, pressurized fluid discharged from a pump has a pulsation, whereby a noise occurs in the power steering apparatus. To reduce the pulsation of the pressurized fluid, a spiral tube formed by spirally winding two band members is disposed in a flexible rubber hose located between the pump and the power steering apparatus. The spiral tube makes in the rubber hose two pressurized fluids which are different in phase of pulsation and causes the two fluids to interfere with each other thereby to reduce the pulsation. In manufacturing, the spiral tube is inserted into a steel pipe which is secured at its one end to the rubber hose and is secured to the steel pipe by being caulked with a caulking tool from the outer surface of the steel pipe.

FIG. 4 shows a caulked portion at which a spiral tube 20 and a steel pipe 13 are fixed in the prior art. The steel pipe 13 is pressed and deformed by a caulking tool 30 having a pressing surface parallel to the steel pipe 13, at its thin one end 131 of a constant thickness shown by the broken line, whereby the spiral tube 20 is fixed to the steel pipe 13.

The pressing at the caulked portion causes the thin one end 131 to be deformed as indicated by the solid line, so that an inside diameter of the thin one end 131 is abruptly changed. As a result, a large clearance is formed between two outer and inner band members of the spiral tube 20 located in the vicinity of the thin one end 131. It has been known that the change in fluid leakage which takes place through the large clearance adversely affects the operation to reduce the pulsation in the pressurized fluid, and the operation to reduce the pulsation is disadvantageously weakened by the influence of the large clearance.

Further, it is difficult to set to a predetermined relation the relative position between the band members of the spiral tube 20 and the extreme end of the thin one end portion 131. To be more exact, the extreme end of the thin one end portion 131 may be in the same axial phase as the outer band member of the spiral tube 20 or as the inner band member thereof. Such dispersion of the relative position between the band members and the extreme end of the thin one end portion 131 occurs on individual hoses, so that the width of the clearance formed between the band members varies on each hose. The variation of the clearance results in the dispersion of fluid leakage, and hoses which are not effective in the operation to reduce pulsation may be produced.

To solve the aforementioned drawbacks, as disclosed in Japanese Examined utility Model Publication No. 2-6315, a pressurized fluid supply hose of the construction is known that a sealant is coated on the outer surface of one end portion of a spiral tube and that the spiral tube is fixedly inserted into a steel pipe through the sealant. Further, as disclosed in Japanese Unexamined Utility Model Publication No. 1-144595, another pressurized fluid supply hose of the construction is known that a cylindrical sealing member is inserted into one end of a spiral tube and that the spiral tube is inserted into a steel pipe and is fixed by caulking at the portion of the sealing member. These hoses are able to prevent the clearance between band members of the spiral tube from being made large by caulking from the outside of the steel pipe and thereby to avoid the variation in the operation to reduce pulsation among the hoses. However, the known hoses necessitate a process for coating the outer surface of the spiral tube with the sealant, or producing the sealing member and then inserting the sealing member into the spiral tube, thereby resulting in increases in the manufacturing cost.

SUMMARY OF THE INVENTION

Accordingly, it is an object of the present invention to provide an improved pressurized fluid supply hose formed of a flexible rubber hose; a steel pipe inserted into one end of the flexible rubber hose and formed at one end thereof a thin portion which is smaller in outer diameter than a body portion of the steel pipe; a socket covering one end of the flexible rubber hose and radially inwardly deformed to secure the one end of the flexible rubber hose on the body portion of the steel pipe; and a spiral tube made of two spirally wound band members and inserted into the rubber hose to define a fluid chamber between an outer surface thereof and an internal surface of the rubber hose, the rubber hose being inserted into the one of the steel pipe at only one end thereof, the thin portion of the steel pipe being radially inwardly deformed so that an internal surface of the thin portion is deformed to represent an internal taper structure whose diameter increases toward the one end of the steel pipe and so that the outer surface of the one end of the spiral tube is deformed along the internal taper surface of the thin portion so deformed so as to be secured by the internal taper structure.

It is another object of the present invention to provide an improved pressurized fluid supply hose formed of a flexible rubber hose; a steel pipe inserted into one end of the flexible rubber hose and formed at one end thereof a thin portion which is smaller in outer diameter than a body portion of the steel pipe; a socket covering one end of the flexible rubber hose and radially inwardly deformed to secure the one end of the flexible rubber hose on the body portion of the steel pipe; a spiral tube made of two spirally wound band members and inserted into the rubber hose to define a fluid chamber between an outer surface thereof and an internal surface of the rubber hose, the rubber hose being inserted into the one of the steel pipe at only one end thereof, the thin portion of the steel pipe being radially inwardly deformed so that an internal surface of the thin portion is deformed to represent an internal taper structure whose diameter increases toward the one end of the steel pipe and so that the outer surface of the one end of the spiral tube is deformed along the internal taper surface of the thin portion so deformed so as to be secured by the internal taper structure; another steel pipe inserted into the other end of the rubber hose; and another socket covering the other end of the flexible rubber hose and radially inwardly deformed to secure the other end of the flexible rubber hose on the another steel pipe.

BRIEF DESCRIPTION OF THE ACCOMPANYING DRAWINGS

Various other objects, features and many of the attendant advantages of the present invention will be readily appreciated as the same becomes better understood by reference to the following detailed description of a preferred embodiment when considered in connection with the accompanying drawings, in which.

DETAILED DESCRIPTION OF THE PREFERRED EMBODIMENT

Figure 1:
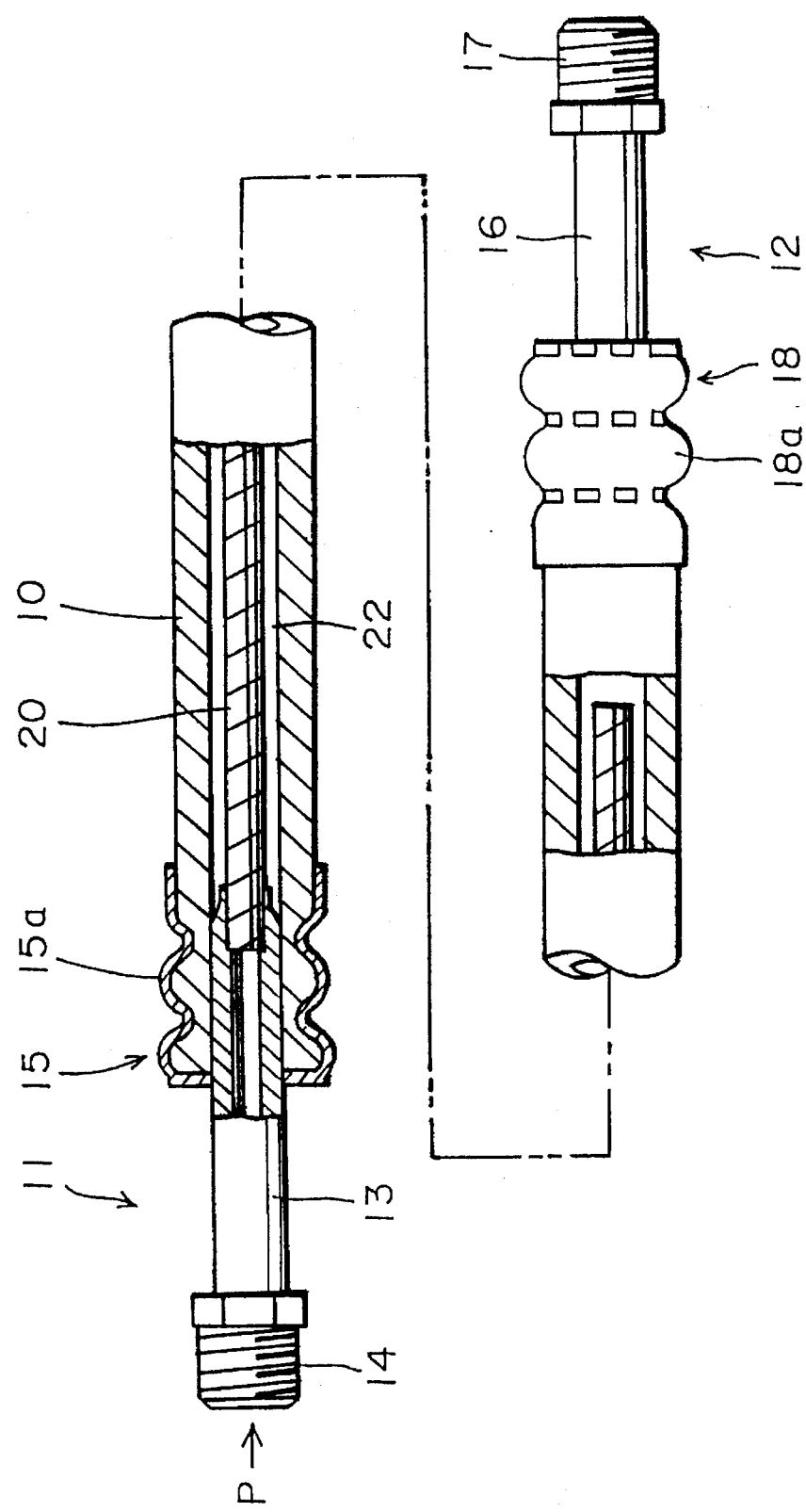
FIG. 1 is a sectional view of a pressurized fluid supply hose according to an embodiment of the present invention.

FIG. 1 shows a pressurized fluid supply hose according to one embodiment of the present invention. In FIG. 1, numeral 10 denotes a flexible rubber hose capable of expanding and contracting, and numerals 11 and 12 denote connecting assemblies for connecting the rubber hose 10 with a pump and a power steering apparatus (both not shown). The connecting assembly 11 is composed of a steel pipe 13, a joint 14 for joining the steel pipe 13 to a discharge port of the pump, and a socket 15. Similarly, the connecting assembly 12 is composed of a steel pipe 16, a joint 17 for joining the steel pipe 16 to an inlet port of the power steering apparatus, and a socket 18. The rubber hose 10 is joined at the both ends thereof with the steel pipes 13, 16, and the rubber hose 10 and each of the steel pipes 13, 16 are integrally fixed by caulking at deformed portions 15a, 18a of the sockets 15, 18.

Figure 3:
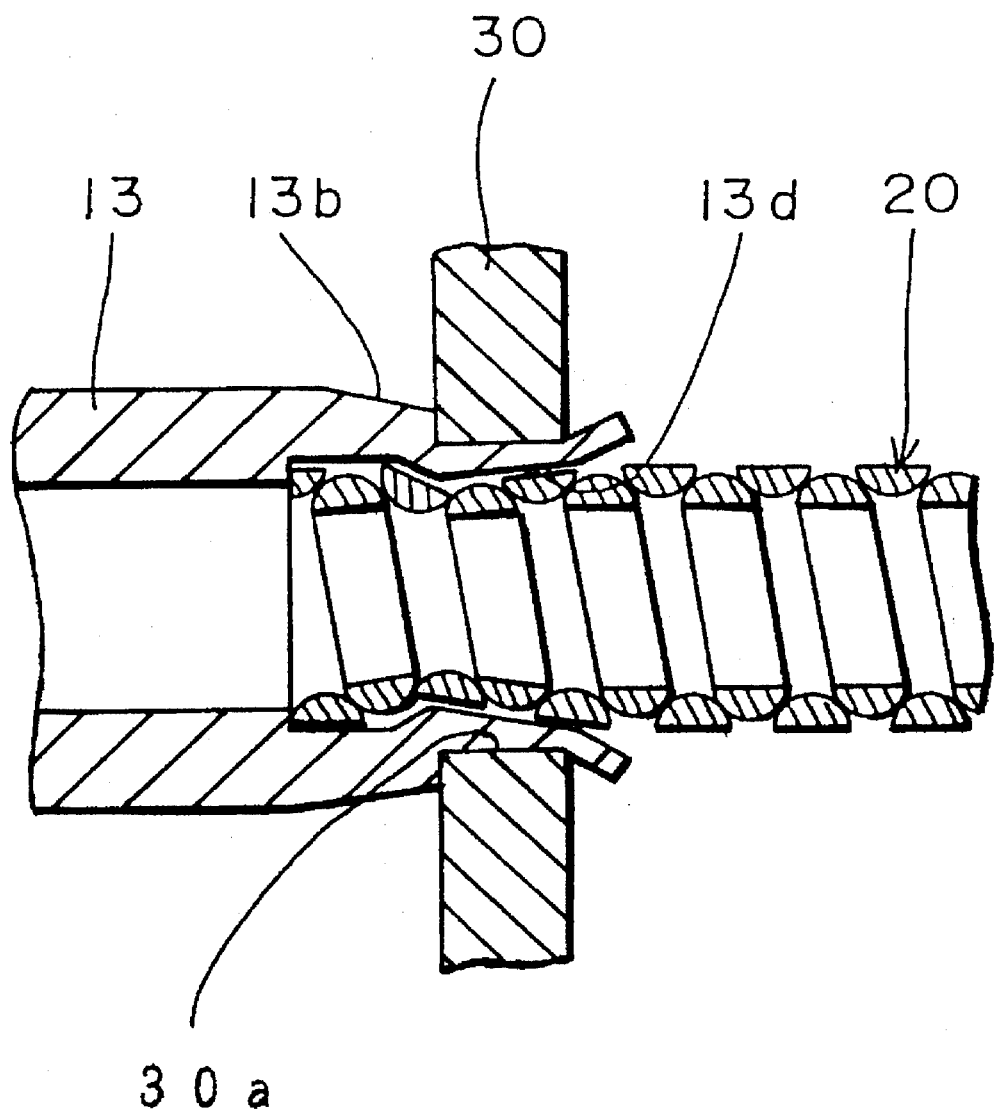
FIG. 3 is an enlarged sectional view of the connection portion between the steel pipe and the spiral tube after caulking.
Figure 4:
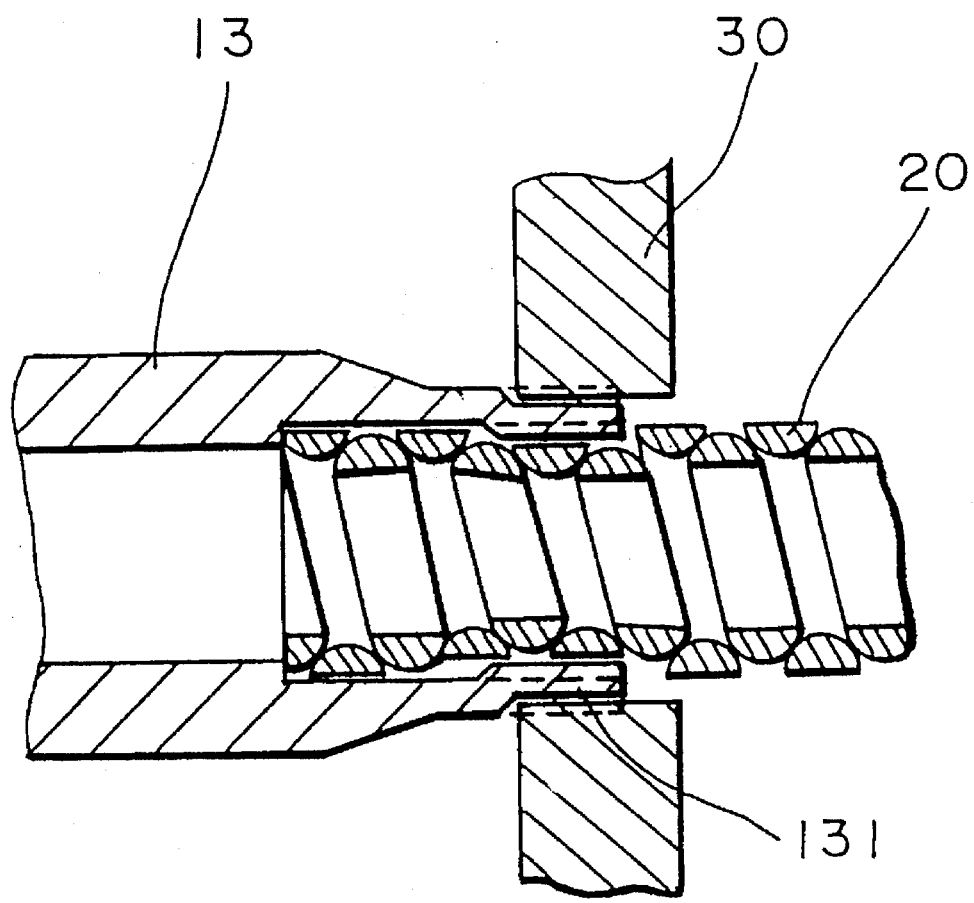
FIG. 4 is an enlarged sectional view of a connection portion between a steel pipe and a spiral tube after caulking in a prior art hose.

At the inside of the rubber hose 10, a flexible spiral tube 20 formed by two spirally wound band members 20a, 20b is arranged. One end of the spiral tube 20 is inserted into the steel pipe 13 at the pump side of the rubber hose 10 and is fixed to the steel pipe 13 by caulking which is effected with a caulking tool 30 (as shown in FIG. 3) from the outer side of the steel pipe 13. The other end of the spiral tube 20 opens to be free within the inside of the rubber hose 10.

Figure 2:
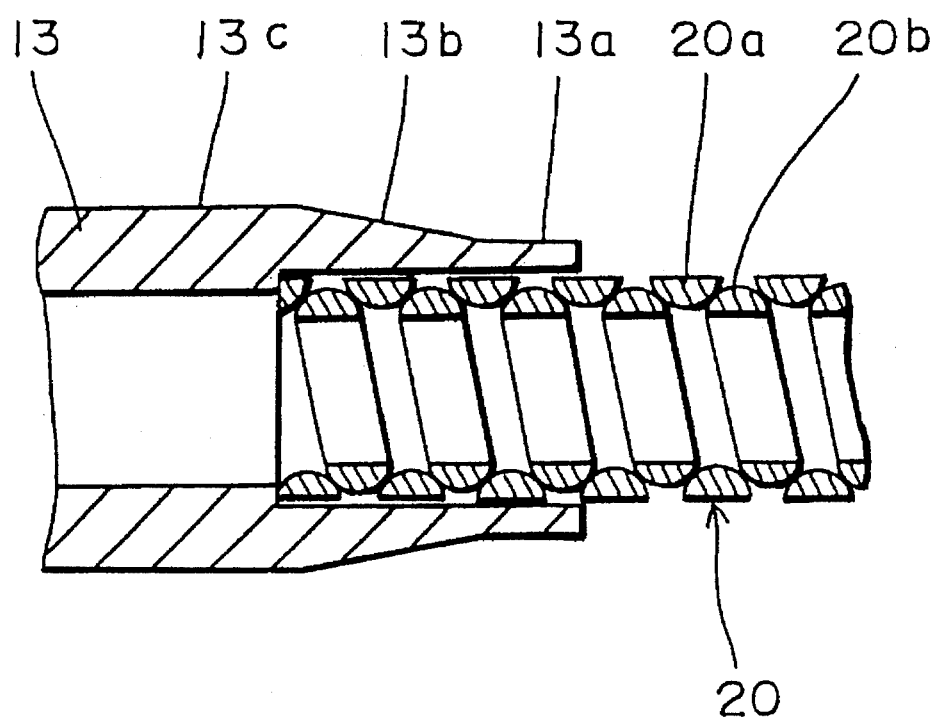
FIG. 2 is an enlarged sectional view of a connection portion between a steel pipe and a spiral tube of the hose before caulking.

The one end of the steel pipe 13 before the caulking, as shown in FIG. 2, is composed of a thin portion 13a, a taper portion 13b and an outer diameter portion (body portion) 13c. The thin portion 13a has an outer diameter being smaller than the diameter of the outer diameter portion 13c and is connected with the outer diameter portion 13c through the taper portion 13b which is formed to slope gradually between the thin portion 13a and the outer diameter portion 13c. The internal surface of the steel pipe 13 at its one end is somewhat enlarged in diameter as is true in the prior art hose.

Next, a process of caulking with the caulking tool 30 the steel pipe 13 on the outer surface of the spiral tube 20 will be explained with reference to FIG. 3. The caulking tool 30 has a pressing portion 30a extending in parallel to the outer surface of the steel pipe 13, and a pressing force is applied on the caulking tool 30, with the pressing portion 30a of the caulking tool 30 being set primarily onto the outer surface of the taper portion 13b. As a result, an inner taper portion 13d which is sloped gradually to make a larger diameter toward the end is formed at the inner side of the steel pipe 13. At the inner taper portion 13d, the spiral tube 20 is fixed to the steel pipe 13.

In the pressurized fluid supply hose of the above-mentioned construction, when pressurized fluid having a pulsation is admitted from the connecting assembly 11, the pressurized fluid passes through the spiral tube 20 in the rubber hose 10 and is discharged from the connecting assembly 12. At that time, in the rubber hose 10, a part of the pressurized fluid flows into a chamber 22 defined between the outer surface of the spiral tube 20 and the internal surface of the rubber hose 10. The part of pressurized fluid is reflected by the end surface of the steel pipe 13, and is conducted as a pressurized fluid having a pulsation which is different in phase from the main stream within the spiral tube 20 into the connecting assembly 12. Where the length of the spiral tube 20 is set to an appropriate length, the phase of the pulsation in the reflected pressurized fluid is offset by one-half wavelength to the phase of pulsation in the fluid admitted into the connecting assembly 11. Therefore, the fluid passing through the spiral tube 20 and the pressurized fluid reflected by the end surface of the steel pipe 13 join at the open end of the spiral tube 20 to interface with each other, so that the pulsation of the pressurized fluid discharged from the steel pipe 16 is reduced.

It is known that where a large clearance exists between the band members 20a and 20b in the vicinity of the steel pipe 13, a fluid leakage takes place through the clearance which adversely affects the operation of the spiral tube to reduce the pulsation in the fluid passing through the pressurized fluid supply hose.

However, according to the present invention, by providing one end of the steel pipe 13 with the taper portion 13b which is sloped gradually to make the diameter become smaller toward the end as shown in FIG. 2, the steel pipe 13, after caulked, is formed at its caulked portion with the inner taper portion 13d which is sloped gradually to make the diameter larger toward the end, as shown in FIG. 3. Therefore, the change in the outer diameter of the spiral tube 20 effected by the caulking becomes gradual or gentle, so that it can be avoided that a large clearance is formed between the band members 20a, 20b of the spiral tube 20. Because no large clearance is formed between the two band members 20a, 20b of the spiral tube 20, the spiral tube 20 effectively operates to reduce the pulsation in the pressurized fluid passing through the hose manufactured according to the present invention.

Although in the aforementioned embodiment, the internal taper surface 13d is formed by providing one end of the steel pipe 13 with a thin portion 13a and a taper portion 13b and then, by caulking the outer surface of the taper portion 13b with the caulking tool 30 which has a pressing surface extending in parallel with the steel pipe 13, the internal surface 13d may otherwise be formed by providing one end of the steel pipe 13 with an elongated thin portion only and then, by caulking the elongated thin portion with a caulking tool which is tapered to gradually open toward the end of the elongated thin portion.

Obviously, numerous modifications and variations of the present invention are possible in light of the above teachings. It is therefore to be understood that within the scope of the appended claims, the present invention may be practiced otherwise than as specifically described herein.

What is claimed is:

1. A pressurized fluid supply hose comprising:

a flexible rubber hose;

a steel pipe inserted into one end of said flexible rubber hose and formed at one end thereof a thin portion which is smaller in outer diameter than a body portion of said steel pipe;

a socket covering one end of said flexible rubber hose and radially inwardly deformed to secure said one end of said flexible rubber hose on said body portion of said steel pipe; and a spiral tube made of two spirally wound band members and inserted into said rubber hose to define a fluid chamber between an outer surface thereof and an internal surface of said rubber hose, said spiral tube being inserted into said one of said steel pipe at only one end thereof, said thin portion of said steel pipe being radially inwardly deformed so that an internal surface of said thin portion is deformed to represent an internal taper surface whose diameter increases towards said one end of said steel pipe and so that the outer surface of said one end of said spiral tube is deformed along said internal taper surface of said thin portion so deformed so as to be secured by said internal taper surface.

2. A pressurized fluid supply hose as set forth in claim 1, further comprising:

another steel pipe inserted into the other end of said rubber hose; and another socket covering said other end of said flexible rubber hose and radially inwardly deformed to secure said other end of said flexible rubber hose on said another steel pipe.

* * * * *